(No Model.) 3 Sheets—Sheet 1.
T. TRIPP.
ELECTRIC CAR TRUCK.
No. 489,883. Patented Jan. 10, 1893.
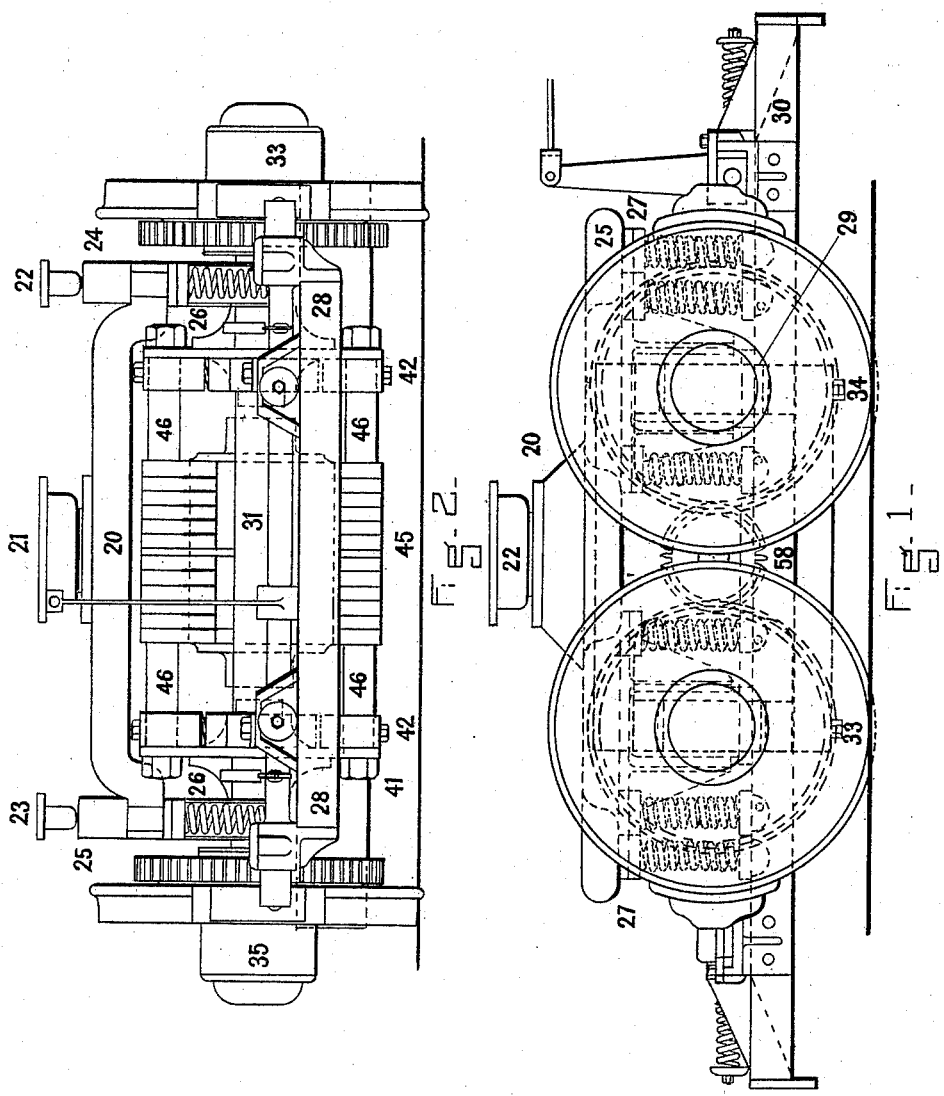
WITNESSES.
Charles R. Ellis.
George L. Dolbeare.
INVENTOR.
Thomas Tripp.
BY
E. Frank Woodbury.
ATTORNEY.

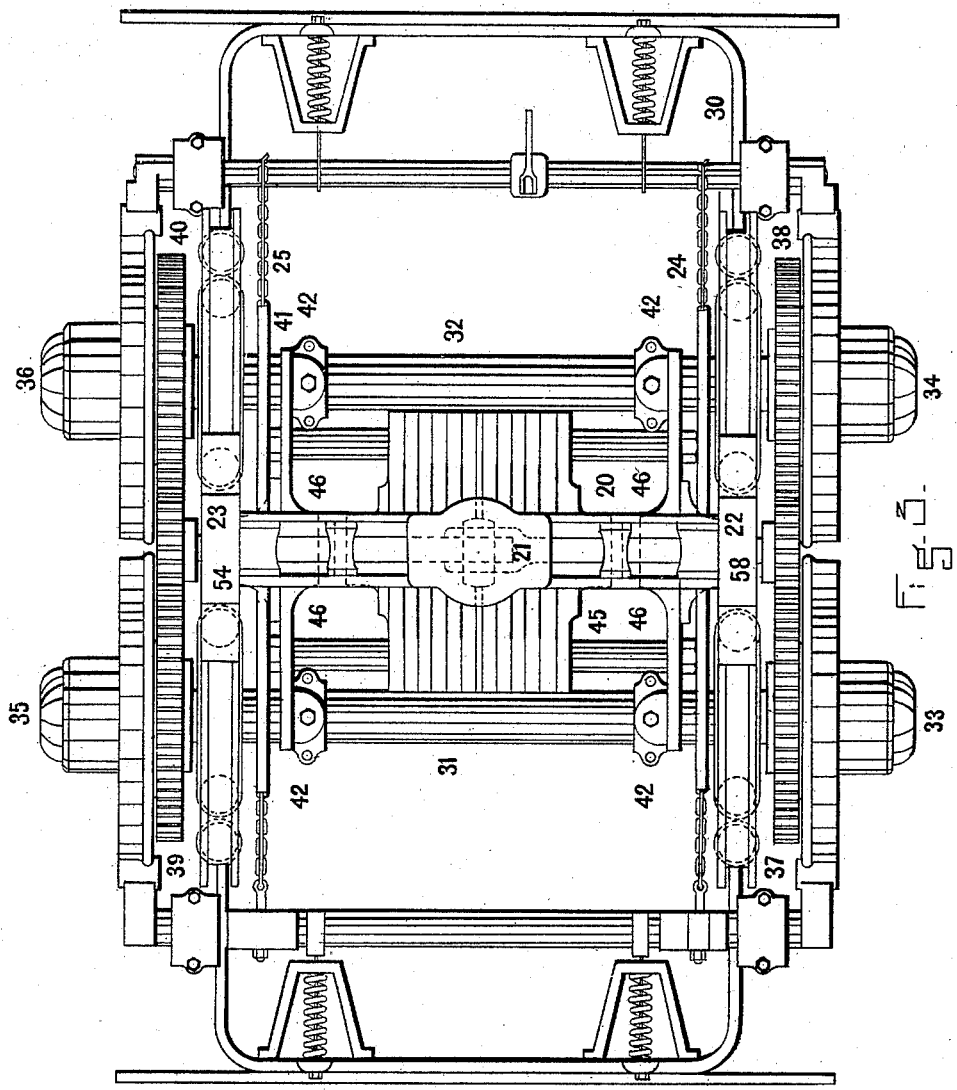

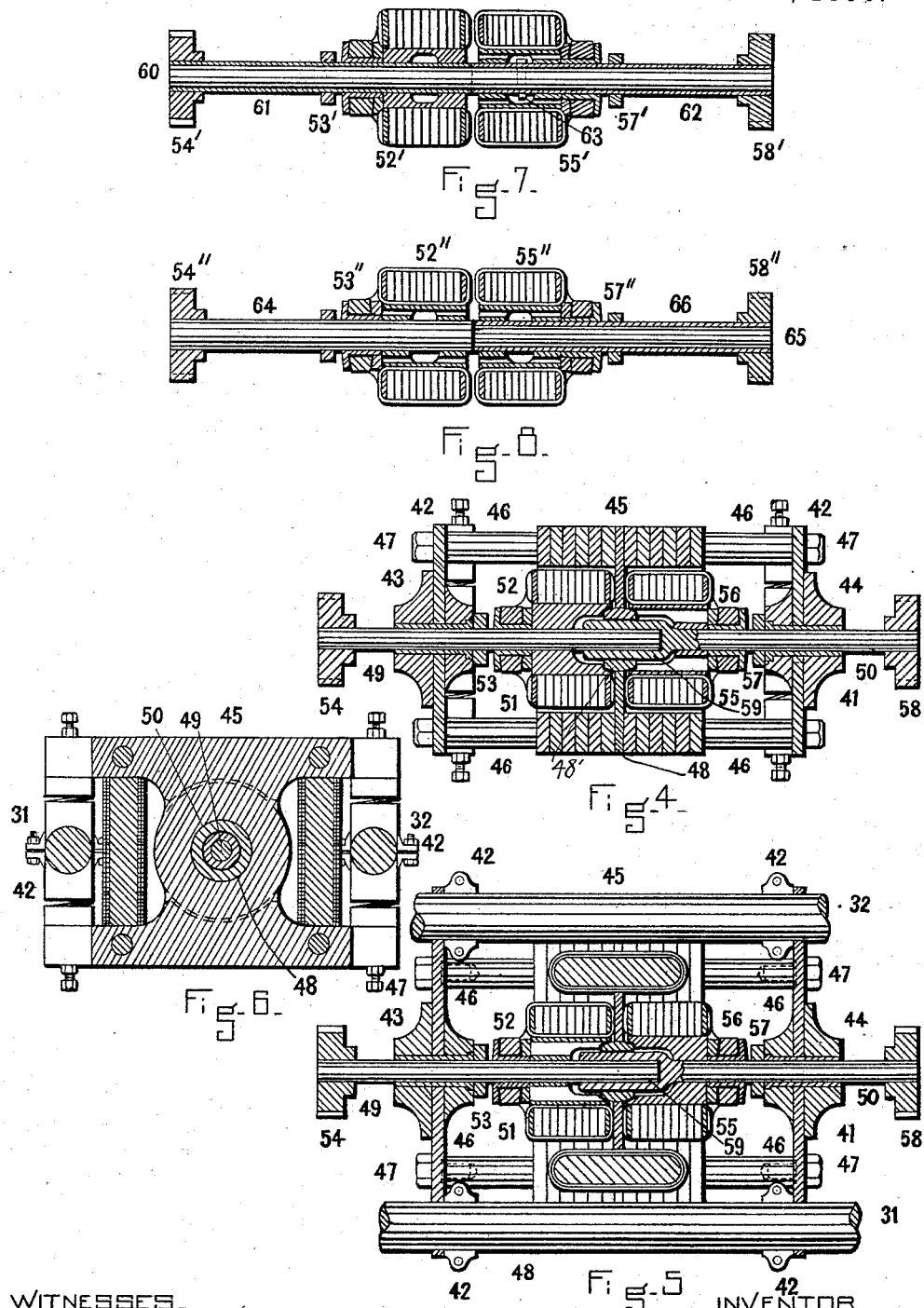

UNITED STATES PATENT OFFICE.

THOMAS TRIPP, OF AVON, MASSACHUSETTS, ASSIGNOR, BY MESNE ASSIGNMENTS, TO WILLIAM G. MEANS, OF BOSTON, MASSACHUSETTS, AND ARETAS BLOOD, OF MANCHESTER, NEW HAMPSHIRE.

ELECTRIC-CAR TRUCK.

SPECIFICATION forming part of Letters Patent No. 489,883, dated January 10, 1893.

Application filed June 30, 1892. Serial No. 438,590. (No model.) Patented in Belgium August 24, 1892, No. 101,119.

*To all whom it may concern:*

Be it known that I, THOMAS TRIPP, a citizen of the United States, residing at Avon, in the county of Norfolk and State of Massachusetts, have invented a new and useful Electric-Car Truck and Motor, (for which I have obtained Letters Patent in Belgium, No. 101,119, dated August 24, 1892,) of which the following is a specification.

My invention relates to improved electric car trucks and motors, especially designed for use in connection with electric cars for street railways and the like, and it is an improvement, in part, upon the electric car truck, for which Letters Patent of the United States were granted to me, August 18, 1891. No. 457,802.

The special object of my invention is to provide a truck and its motor, so constructed and arranged, that an electric car, fitted with my improved truck and motor may be easily driven around curves, and this result, when obtained, will greatly increase the safety, efficiency, and durability of the motor, truck, and car.

Figure 1. represents, the truck in side elevation. Fig. 2. represents the truck in end elevation, and Fig. 3. represents the truck in plan. Fig. 4. is a vertical center section of the motor. Fig. 5. is a horizontal center section of the motor, a portion of the car axles being shown in plan, and Fig. 6 is a vertical center cross section of the motor, the car axles being shown in section. Fig. 7 is a longitudinal sectional view of the armature showing a modified construction of the armature shaft, and Fig. 8. is also a similar view illustrating a modified construction of the armature shaft.

The truck proper illustrated by Figs. 1, 2, and 3 is constructed and its parts arranged substantially as shown and described in my said Letters Patent of August 18, 1891, and it is provided with the following:—Truck bolster 20, provided with center plates 21, and side bearings 22 and 23; side pieces 24 and 25 to which are secured the pedestals, as 26, spring cups as 27; spiral springs, as 28; fixed axle boxes, as 29, provided with the axle-box tie bar 30; fixed axles 31 and 32, to which are fitted the loose wheels 33—34—35 and 36, which are provided, respectively, with the gears 37—38—39, and 40; and the brake gear, which consists of the brake beams, shoes, levers, rods, and connecting operative mechanism.

The motor, represented in plan, side elevation, and end elevation, in Figs. 3, 1. and 2, respectively, and shown in vertical center section, horizontal center section, and vertical center cross section by Figs. 4—5. and 6. respectively, is constructed as follows: It is provided with the frame, 41, and it is held in suspension upon and between the fixed axles 31 and 32. by means of the spring boxes, as 42. This frame is provided with the armature shaft bearings 43 and 44. The field 45 is secured to the frame by means of the stays, as 46, and the stay bolts, 47, and the magnetic field is constructed in the usual manner, except that the partition 48 carrying a shaft bearing 48'. is placed between and fastened to the iron plates composing the field.

The divided armature shaft is composed of the two armature shafts 49. and 50. Shaft 49. is provided with the armature 51, having the commutator 52, thrust collar 53 to receive the outward thrusts of the shaft, and pinion 54, which is designed to mesh with and drive the gears 39 and 40, thereby driving the loose wheels 35 and 36. The shaft 50, is provided with the armature 55, having the commutator 56, thrust collar 57, to receive the outward thrusts of the shaft, and the pinion 58, which is designed to mesh with and drive the gears 37 and 38, thereby driving the loose wheels 33 and 34, the inner end of the shaft 50 is provided with the sleeve portion 59. which is adapted and designed to receive within it the inner end of shaft 49. This sleeve portion serves as a bearing for the inner end of shaft 49. The safety bearing or stop 48'. is made to fit loosely about the sleeve portion of shaft and it is designed to prevent the armature from striking the field, within which it revolves, when in operation.

The armature represented by Fig. 7, illustrates one of the many modifications of the armature shaft which may be used to obtain the results sought by using a divided armature shaft.

The construction of the armature is substantially the same as shown in Figs. 4—5 and 6, except in the construction of the armature shaft, which is made as follows: The shaft 60 is provided with the two tubes 61, and 62. To the tube 61, which is free to revolve upon the shaft 60. is fastened the armature 52' the thrust collar 53', and the pinion 54'.

To the tube 62, which is fastened to shaft 60, by means of the key 63, are fastened the following:—Armature 55', thrust collar 57', and pinion 58'. This construction permits the differential movements of the pinions 54' and 58'.

The armature represented by Fig. 8, illustrates another modification of a divided armature shaft. The armature shaft 64, for one half of its length, is provided with the reduced portion 65, on which the tubular armature shaft 66, is loosely mounted. Shaft 64 is provided with the armature 52'', thrust collar 53'', and pinion 54''. Shaft 66 is provided with armature 55'', thrust collar 57'', and pinion 58''. It is obvious that this construction of a divided armature shaft will also permit the differential movements, in operation, of the pinions 54'' and 58''.

Armatures illustrated by Figs. 7 and 8. are designed to fit the motor shown by Figs. 4—5 and 6.

It is intended that the usual brushes should be supplied of the common kind, and electrical connections should be made in the usual manner.

It is obvious, that by dividing the field as by partition 48, Fig. 4 into two parts and making the electrical connections accordingly, two fields may be made, one for each armature.

In operation, the pair of loose wheels driven by one armature shaft may be driven at a different speed, from the pair of wheels driven by the other armature shaft. This permissive differential speed will produce valuable results, when in operation, especially in rounding curves.

What I claim as new and desire to secure by Letters Patent is—

1. In an electric vehicle truck, the combination of two axles, loose wheels adapted to rotate on said axles, gears connected with said wheels, two independently rotatable shafts provided with armatures, field magnets, and pinions on said shafts, each pinion meshing with the two gears connected with the wheels of one side of the truck, substantially as set forth.

2. In an electric vehicle, the combination of an axle, loose wheels adapted to rotate on said axle, two independently rotatable shafts disposed in alignment, the inner end of one shaft being disposed in a socket at the inner end of the other shaft, bearings for the outer ends of said shafts, a fixed bearing for the socket end of one of said shafts, armatures on said shafts, field magnets, and connecting mechanism between said loose wheels and said shafts, substantially as set forth.

3. In an electric vehicle, the combination of a frame, field magnets supported in said frame, a transverse partition dividing said field magnets, a shaft bearing disposed in said partition, an armature shaft provided with a socket at its inner end and supported in said bearing, a shaft journaled at its inner end in said socket, bearings for the outer ends of said shafts, armatures on said shafts, severally disposed on opposite sides of said partition, and mechanism connecting said armature shafts with the running gear, substantially as set forth.

4. In an electric vehicle, the combination of an axle, loose wheels adapted to rotate on said axle, an electric motor having two independently rotatable armature shafts disposed in endwise relation to each other, and connecting mechanism between said loose wheels and said shafts, substantially as set forth.

In testimony whereof I have signed my name to this specification in the presence of two subscribing witnesses.

THOMAS TRIPP.

Witnesses:
E. FRANK. WOODBURY,
CHARLES L. ELLIS.